United States Patent
Bochow et al.

(10) Patent No.: US 10,798,277 B2
(45) Date of Patent: Oct. 6, 2020

(54) METHOD FOR MANUFACTURING CAMERA MODULES AND A CAMERA MODULE ARRAY

(71) Applicant: Robert Bosch GmbH, Stuttgart (DE)

(72) Inventors: Anne Bochow, Echterdingen (DE); Adrian Severin Matusek, Stuttgart-Rohr (DE); Alexander Fischer, Untergruppenbach (DE); Andreas Reppich, Leonberg (DE); Andreas Kugler, Alfdorf (DE); Istvan Denes, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 16/133,259

(22) Filed: Sep. 17, 2018

(65) Prior Publication Data

US 2019/0089878 A1    Mar. 21, 2019

(30) Foreign Application Priority Data

Sep. 21, 2017    (DE) .................. 10 2017 216 709

(51) Int. Cl.
   *H04N 5/225*    (2006.01)
(52) U.S. Cl.
   CPC ......... *H04N 5/2254* (2013.01); *H04N 5/2253* (2013.01); *H04N 5/2257* (2013.01)

(58) Field of Classification Search
   CPC ... H04N 5/2254; H04N 5/2257; H04N 5/2253
   See application file for complete search history.

(56) References Cited

U.S. PATENT DOCUMENTS

| 2011/0246238 | A1 | 10/2011 | Vdovjak et al. |
| 2012/0068288 | A1 | 3/2012 | Hsin et al. |
| 2017/0082466 | A1* | 3/2017 | Geisler ............ H01L 27/14618 |
| 2017/0115550 | A1* | 4/2017 | Apelt ...................... B60R 11/04 |
| 2018/0035025 | A1* | 2/2018 | Apelt ................... G09G 3/3266 |

FOREIGN PATENT DOCUMENTS

| DE | 102006006113 A1 | 8/2007 | |
| DE | 102015213575 A1 | 8/2016 | |
| JP | 2005268967 A | 9/2005 | |
| WO | WO-2015135725 A2 * | 9/2015 | .......... G01D 11/245 |
| WO | WO-2015192998 A1 * | 12/2015 | .......... H04N 5/2257 |
| WO | WO-2016128173 A1 * | 8/2016 | .......... H04N 5/2257 |

* cited by examiner

*Primary Examiner* — John P. Dulka
(74) *Attorney, Agent, or Firm* — Norton Rose Fulbright US LLP; Gerard Messina

(57) ABSTRACT

A method for manufacturing a camera module, the camera module including a circuit carrier, an image sensor and an optical system holder, including: mounting the image sensor on the circuit carrier; applying a protective layer to the circuit carrier, in which the image sensor is not covered by the protective layer and the protective layer simultaneously forms the optical system holder.

12 Claims, 6 Drawing Sheets

METHOD FOR MANUFACTURING CAMERA MODULES AND A CAMERA MODULE ARRAY

RELATED APPLICATION INFORMATION

The present application claims priority to and the benefit of German patent application no. 10 2017 216 709.2, which was filed in Germany on Sep. 21, 2017, the disclosure which is incorporated herein by reference.

FIELD OF THE INVENTION

The present invention relates to a method for manufacturing camera modules and a camera module array.

BACKGROUND INFORMATION

Multiple methods are already believed to be understood from the related art for manufacturing camera modules, for example, from DE 10 2006 006 113 A1.

SUMMARY OF THE INVENTION

The present invention describes a method for manufacturing a camera module, the camera module including a circuit carrier, an image sensor and an optical system holder, including the steps:
mounting the image sensor on the circuit carrier and applying a protective layer to the circuit carrier. With the method, the image sensor is not covered by the protective layer when the protective layer is applied, and the applied protective layer simultaneously forms the optical system holder.

The fact that the image sensor is not covered by the protective layer means, in particular, that the active surface of the image sensor is not covered. Since the protective layer may be impervious to light, this would otherwise potentially result in an impairment of the sensor. Border areas of the image sensor may also be overlaid by the protective layer. Thus, at least portions, in particular, optically active portions of the image sensor, must be left exposed or must not be covered by the protective layer.

An optical system holder is understood to mean a device to hold an optical system. An optical system is understood to mean individual lenses or additional prevalent optical elements. An optical system is understood to mean, in particular, multiple lenses, which deflect light in a desired manner and are intended to image surroundings on an image sensor. These lenses may be situated, in particular, in a separate lens holder which, together with the lenses and, if necessary, additional optical elements, form an objective. In this case, the optical system holder is configured to accommodate the objective. Such an accommodation may take place, for example, via a press fit. Such an accommodation may take place, in particular, via an active alignment method, in which the objective is aligned relative to the image sensor in such a way that a good imaging of surroundings on the image sensor may take place. Once actively aligned, the objective may be fastened in the optical system holder with the aid of an adhesive.

This method offers the advantage that the electronics of the manufactured camera modules are fully protected with this method from environmental influences. In addition, as a result of targeted function integration and the use of functional material, very few process steps and individual parts are required. In addition, the structure is configured in a simple and space-saving manner. As a result, it is possible with the aid of this method to cost-efficiently manufacture ultra-small camera sensors in large formats.

Moreover, the assembly process for a subsequent mounting of lenses or an objective are simplified significantly and the number of packaging steps and process steps is significantly reduced. Processing times and costs may be saved as a result.

Additional advantages of the method are a high reliability due to a compact configuration and a fully casted structure, an exposure of optically active surfaces during packaging of the image sensor directly on the sensor carrier or a system circuit board and the possibility of manufacturing camera modules in large format and, therefore, cost-efficient circuit panels. A planar assembly technology may also be used for equipping the integrated components, in part also with a narrow grid dimension. With the encapsulation of sensitive components and systems during the molding process, a high degree of reliability of the camera module is achieved as a result of the protection of the components.

A high packing density is also achieved, if, in addition, electronic components are integrated into the circuit carrier using embedding technologies. The equipping of the camera modules on foils in the roll-to-roll method or on circuit boards in large panels is also enabled. In this method, the brand new foil is unwound from a roll and at the same time the foil already used is rewound again on a second roll. Very rapid clock cycles are possible with the aid of this method.

In another specific embodiment of the method, the camera module includes at least one optical element, which is applied in an additional step with the aid of an injection molding process. Conventionally manufactured lens systems may optionally also be used in this specific embodiment.

This specific embodiment of the present invention offers the advantage that the image sensor as well is protected from contamination with the aid of the optical element. In addition, it is possible in this method already to mount a first optical element on the image sensor, which may contribute to improving the optical properties of the image sensor.

In another specific embodiment of the method, the circuit carrier is configured as foil. The foil in this case is, in particular, a glass fiber-reinforced epoxy resin foil, to which strip conductors are applied.

This specific embodiment of the present invention offers the advantage that a very cost-efficient production of the camera module is enabled. The foil may be very thin and may have a thickness of less than 250 µm, in particular, less than 210 µm, further in particular less than 200 µm. Foils reinforced with glass fibers, in particular, lend themselves as circuit carriers. The base substance of the foils may be formed, for example, by epoxy resin. The foils may optionally be equipped with strip conductors, which are manufactured, for example, in known circuit board technology. The strip conductors may be manufactured, for example, from copper or from a comparable material.

In another specific embodiment of the method, the circuit carrier is constructed of at least two layers, at least one electronic component being embedded between the layers.

The individual layers in this case may be configured, in particular, as conductor foils, which may be produced, in particular, reinforced with glass fibers and made of epoxy resin. To manufacture the circuit carrier, these foils may be laminated. At least one electrical component, for example, a processing unit, is inserted between at least two foils. Multiple electronic components may also be installed or embedded between the layers.

This specific embodiment of the method offers the advantage that very compact camera modules are manufacturable, since surface areas provided for these are no longer needed on the surface of the circuit carrier due to the embedding of the additional optical components.

In another specific embodiment of the method, the method includes the additional step of attaching soldering points on the camera module. The soldering points in this case are configured, in particular, as soldering bumps.

These soldering points may optionally be applied after a removal of the tool panel. The attachment in this case takes place, for example, on the rear side of the circuit board. As an alternative to attaching soldering bumps, another contacting, for example, with plugs or the like, may also be carried out.

The bumps and/or additional electrical connections is/are installed, in particular, at the end of the process chain, in particular, before a separation of the camera modules, in the event multiple camera modules are manufactured simultaneously.

In another specific embodiment of the present invention, the protective layer is applied with the aid of a local pressure molding process, in which a molding compound is added to a separating foil and subsequently pressed locally onto the circuit carrier and/or onto the components mounted on the circuit carrier.

The separating foil in this case may be situated in such a way that it spans a molding tool, so that this tool does not come into contact with the molding compound. As a result, the separating foil separates the molding tool from the molding compound. Since the separating foil is also fitted in between the molding tool and the camera module, this foil offers the advantage that it protects the camera module from damage, which may result when the molding tool directly contacts the camera module. Contamination of the tool and of the sensor with molding compound is also prevented, as a result of which the molding process may be carried out more rapidly on the one hand, and more reliably on the other hand. Locally, here means, in particular, that the pressure is not applied uniformly to the circuit carrier, but is applied locally at noncritical points. This is ensured, for example, by leaving particular areas of the sensor carrier exposed. In addition, the pressure application may take place with the aid of individual cylinders, the surface area of which is smaller than that of the circuit carrier, as a result of which different pressures are present in the intermediate spaces between two pressure cylinders, than those directly below the pressure cylinders.

Moreover, this specific embodiment of the present invention offers the advantage that a highly precise application of the molding compound or of the protective layer to the electronic components and to the circuit board is enabled. At the same time, the use of this method allows for the omission of predefined areas, which are therefore not covered by the molding compound. In this way, it is possible to leave active areas of the image sensor exposed, so that an optimum image quality may be ensured. In addition, the contact pressures in the local pressure molding process may be adapted in such a way that no damage to the camera modules results. The protective layers made of molding compound applied with the aid of this method may have different thicknesses. Layers of approximately 1 mm in thickness have proven advantageous. However, the thickness may be varied depending on the particular application. In this method, protective layer thicknesses are applied, in particular, having a thickness of less than 1.5 mm, in particular, less than 1.1 mm, in particular of less than 1 mm.

Defined structures may also be mounted on the circuit carrier with the aid of this molding process. For example, the optical system holder may be configured so that no additional process steps are required here.

The components mounted on the circuit carrier may be arbitrary electronic components. These may, for example, be chips such as, for example, processors and/or diodes and/or strip conductors.

In another specific embodiment of the present invention, the molding compound is impervious to light in a cured state. The molding compound in this case is made, in particular, of epoxy resin.

This specific embodiment of the present invention offers the advantage that the circuit carrier and, if necessary, elements situated on the circuit carrier, are protected from irradiation, media, temperature stresses, etc. This may increase the service life and the reliability of the camera modules. Instead of epoxy resin, it is also possible to use other materials, which exhibit comparable material properties.

In another specific embodiment of the present invention, the optical elements are shaped as lenses in the injection molding process. A lens may also be understood to mean merely an optically active layer, which exhibits few or no curvatures.

This specific embodiment of the present invention offers the advantage that all lenses may be manufactured in an automated manner in one process and simultaneously mounted. As a result no individual equipping by hand or machine is necessary. In this way, manufacturing costs may be saved and the production time shortened.

To manufacture and simultaneously mount the lenses in the injection molding process, the injection compound, which may, for example, be a liquid silicone rubber (LSR), may either be merely injected into the exposed areas, or distributed over the entire surface area of the camera modules. The local injection into the exposed surface areas offers the advantage that less material is required. In contrast, fewer injection nozzles may be used when extensively applying the injection compound.

In another specific embodiment of the method, a contour punch is used to shape the lenses, so that the lenses have a concave, convex or plane-parallel shape.

This specific embodiment of the present invention offers the advantage that, depending on the particular application, it is possible to equip the camera modules with different lenses. In this way, different camera modules may be manufactured with the aid of the same method, depending on the requirements. Merely the contour punch need be replaced.

In another specific embodiment of the method, a microstructuring is introduced onto the lens surfaces.

This specific embodiment of the present invention offers the advantage that a contour is applied to the lenses during the manufacturing process, which produces additional positive optical properties. A microstructuring may be applied, for example, which exhibits anti-reflective properties.

In addition, a method for manufacturing a camera module array made up of at least two of the camera modules described above. The camera modules in this case are mechanically connected to one another. The circuit carriers of the camera modules, in particular, are connected to one another. Furthermore, the circuit carriers are formed by a cohesive conductor foil.

This method offers the advantage that all camera modules are produced on a shared, mechanically connected substrate and, as a result, multiple camera modules may be simultaneously processed with the aid of one method step. This increases the clock cycle for manufacturing the camera modules, thereby enabling a more cost-efficient and more rapid manufacture. The shared substrate may be, in particular, a conductor foil, which simultaneously forms the circuit carriers of the individual camera modules. Alternatively, it is also conceivable that the camera modules are mechanically connected to one another as a result of being applied to a shared substrate, for example, to a foil that is decoupled from the electronics of the camera modules. As a result of this as well, the camera modules may be jointly processed and the indicated advantages achieved.

In another specific embodiment of the method, the camera module array is fabricated on a conductor foil and is made up of at least four camera modules. The camera modules in this case are situated, in particular, in rows and columns.

This specific embodiment of the present invention offers the advantage that multiple camera modules, in turn, may be processed simultaneously and, in addition, these multiple camera modules are aligned in such a way that a precise processing is made possible. Corresponding tools may be fabricated using predefined templates, which make a reliable and high precision fabrication possible. It is also possible in such an arrangement to easily separate the camera modules, for example, with the aid of a milling cutter or a saw. The camera modules in this case may be situated, for example, in at least two rows and two columns, further, in particular, in at least 10 rows and 10 columns.

Alternatively, it is also possible for the modules to be situated in merely one row. Different arrangements may be advantageous depending on the circuit board and/or conductor foil and tool used.

A method for manufacturing a camera module, a camera module array initially being manufactured according to the method described above and the method including the additional step of separating the camera modules, in particular with the aid of a milling cutter and/or a saw.

This specific embodiment of the present invention offers the advantage that the method delivers finished camera modules, which may be installed in this form directly in cameras or camera systems.

DETAILED DESCRIPTION

Figure 5:
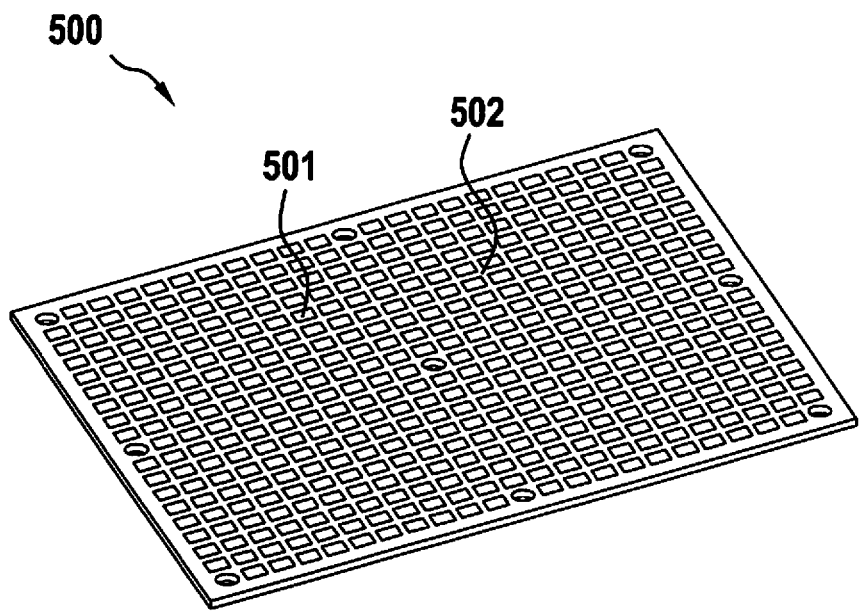
FIG. 5 shows a finished camera module array on a carrier foil.

FIG. 5 depicts by way of example, a finished camera module array 500. Camera module array 500 has been manufactured on a cohesive conductor foil, which in this exemplary embodiment forms a shared circuit carrier.

Figure 4:
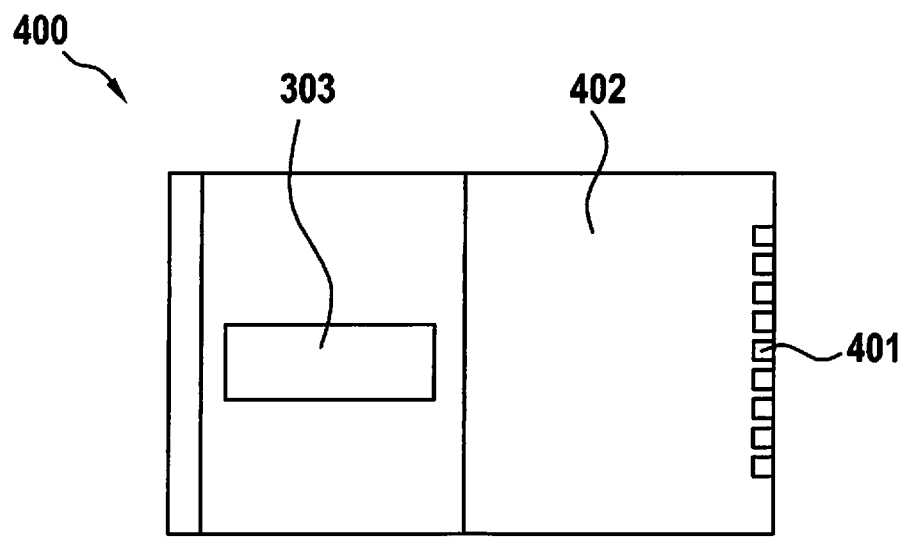
FIG. 4 shows a camera module after a molding process.

Camera module array 500 is made up of multiple camera modules, including for example 501 and 502. Each of the modules is represented by the camera module 400 of FIG. 4. The camera module array 500 may assume different dimensions and shapes. Depicted by way of example in FIG. 4 is the camera module 400, which is made up of a circuit carrier, an image sensor 303 and an optical system holder. Camera module 400 is largely covered by molding compound 402, which protects the components mounted on the circuit carrier. Only the area above image sensor 303 and the area at contact points 401 were left exposed during the molding process. Depending on the exemplary embodiment, it is also possible for only the area above sensor image 303 to be left exposed, for example, if contact points 401 are located laterally and/or on the rear side of the circuit carrier (i.e., not on the side on which the image sensor is mounted). The optical system holder is formed around the image sensor with the aid of the molding compound (not recognizable due to the perspective in FIG. 4).

Figure 3:
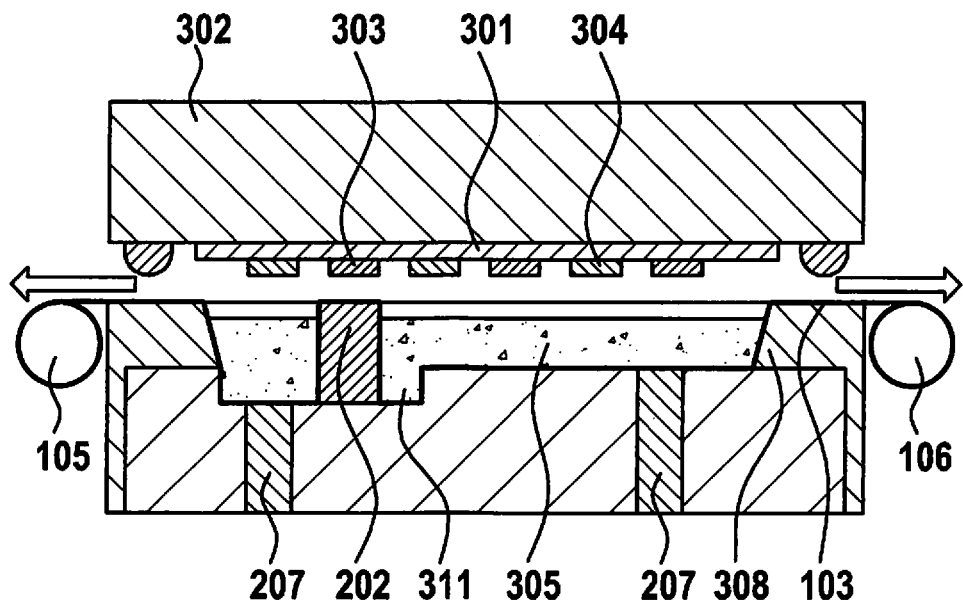
FIG. 3 shows a sectional view of a camera module in a tool.

The molding process incorporated in the manufacturing process of the camera module array is depicted by way of example in FIG. 3. A sectional image is depicted, which shows by way of example the application of molding compound 305 on an area of circuit carrier 301. An image sensor 303 is mounted on the circuit carrier. Additional electronic components 304 are also situated on circuit carrier 301, in this exemplary embodiment, multiple processing units.

To apply molding compound 305, the circuit carrier is mounted on a pressing plate 302. In this exemplary embodiment, the circuit carrier is held in position by applying a negative pressure (suction) to pressing plate 302.

A foil 103 is placed on a lower tool part 308, which is unwound from a roll 105 and is rewound again on an additional roll 106. In this way, a rapid equipping of the lower tool part with unused foil 103 may be implemented once the molding process is completed. No contaminations of the tool result and molding compound residues potentially remaining on the foil do not influence and/or soil the camera modules that are processed in a subsequent molding process.

Lower tool part 308 includes at least one cavity, into which molding compound 105 is added after foil 106 is applied. In order to leave particular areas of circuit carrier 301 or of individual components 303 on circuit carrier 301 exposed or not to cover with molding compound, webs 202 may be inserted at specific points in lower tool part 308. With the aid of these webs 202, it may be ensured that no molding compound 305 is pressed onto image sensor 303, and the image sensor remains exposed. In addition, the tool part may include special recesses, which are configured to form optical system holder 311. These recesses in this exemplary embodiment are somewhat deeper than the cavity, which is configured for applying the protective layer.

In order to prevent air pockets under the molding compound, a vacuum is generated or the air density is reduced in this exemplary embodiment between lower tool part 308 and pressing plate 302, or, the camera module. Molding compound 305 is subsequently pressed locally with the aid of compression cylinders 207 onto circuit carrier 301 and onto components 304 mounted on circuit carrier 301.

Figure 2:
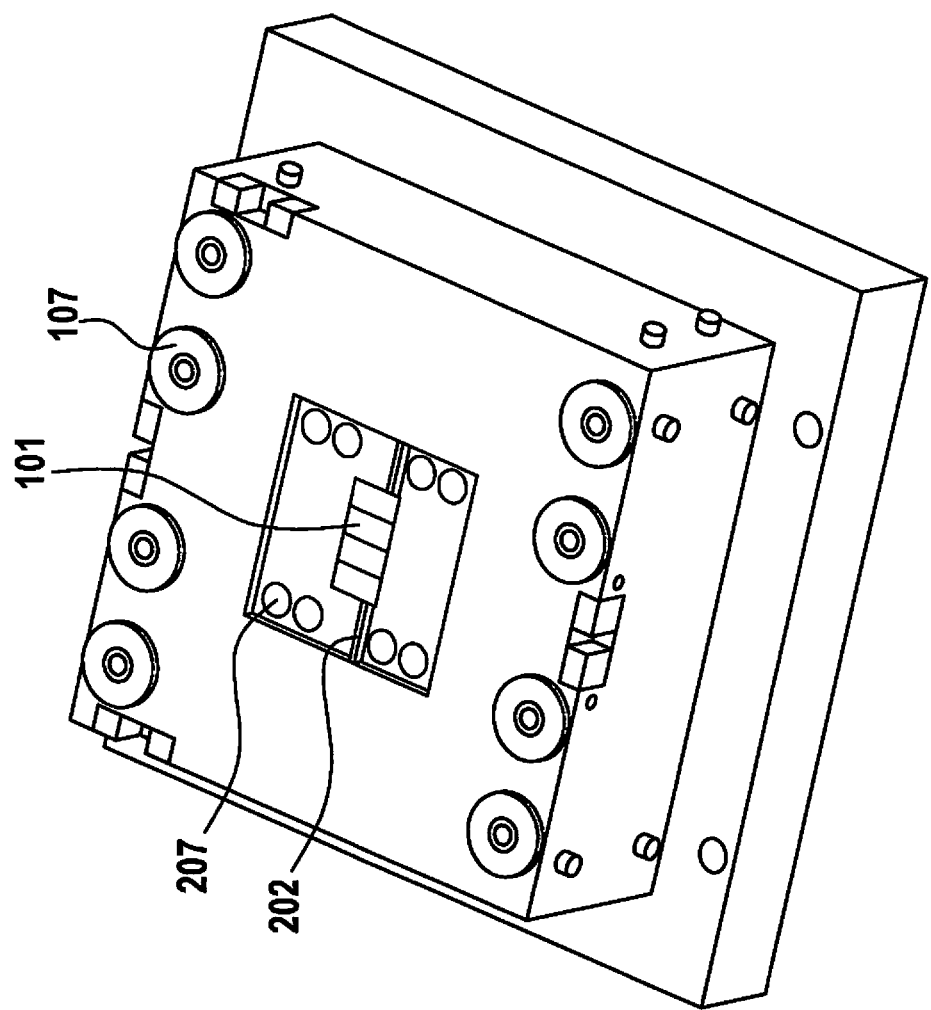
FIG. 2 shows a camera module array in a tool (foil is not depicted).

The tool used for the "local pressure molding" is depicted once again in FIG. 2. In order to establish a spacing between lower tool part and pressing plate 302 optimal for the method, additional spacing elements 107, the height of which may be varied, may be placed on lower tool part 308. In the structure depicted in FIG. 2, a camera module array made up of four camera modules 101 is manufactured. The sealing web for the seal (gap) of the detection area of image sensors 303 is also visible.

Figure 1:
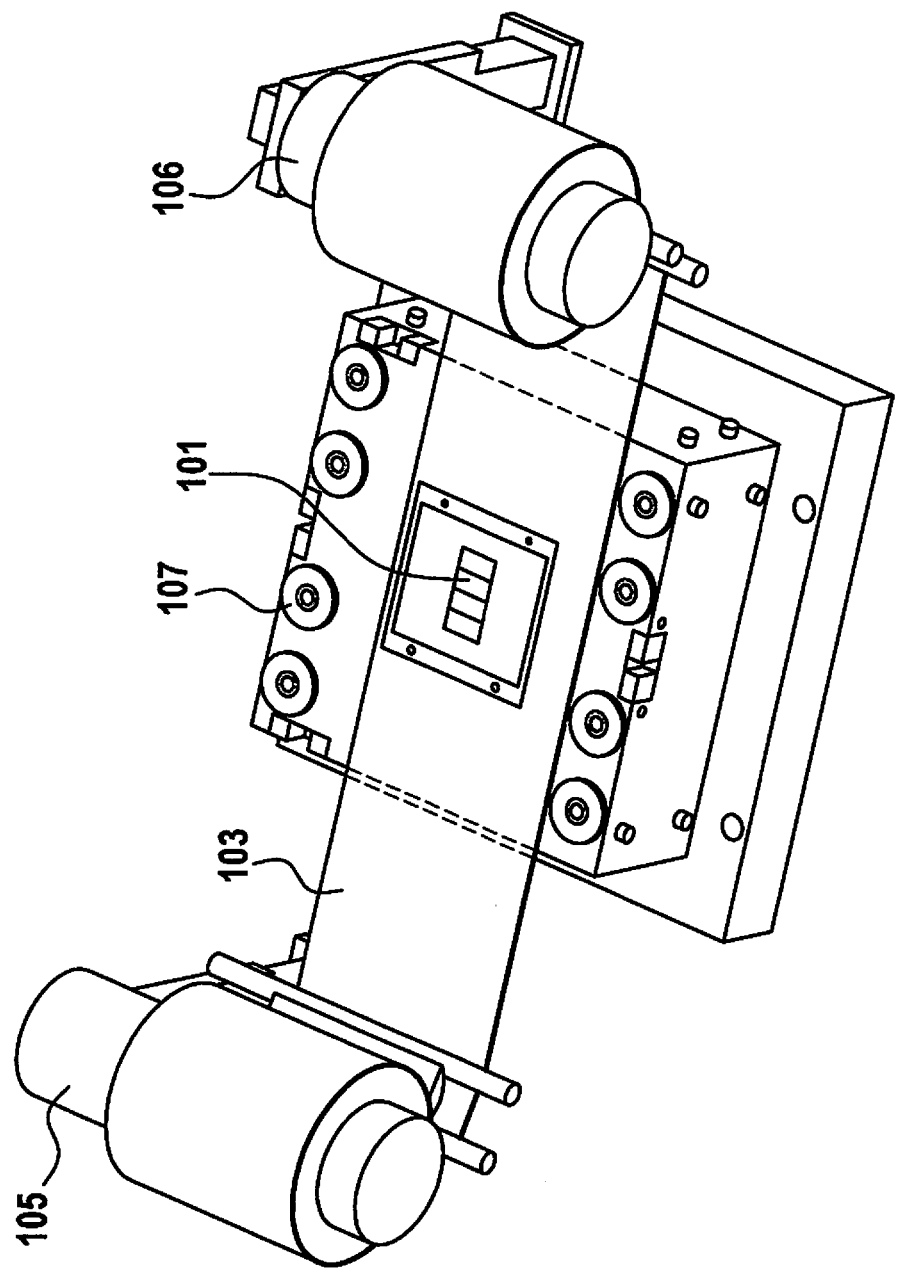
FIG. 1 shows a tool for manufacturing a camera module array.

The tool for applying molding compound 105 to sensor carrier 301/electronic components 304, including rolls 105, 106 for foil 103 is also depicted once again in FIG. 1.

Figure 6:
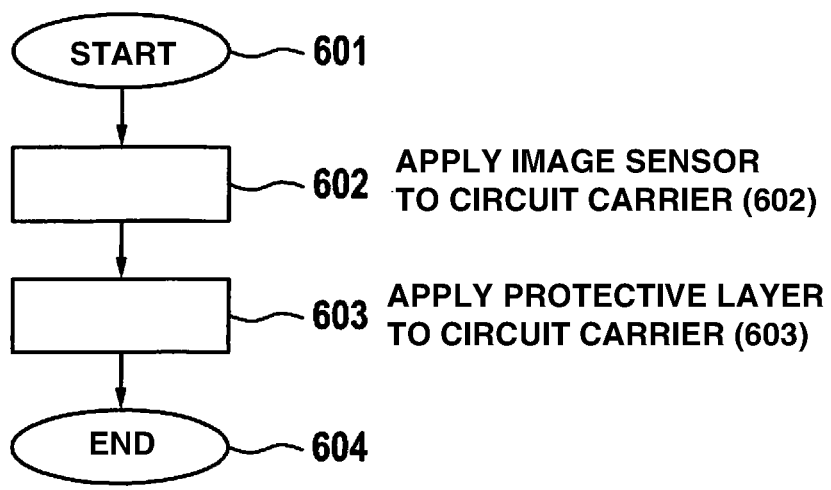
FIG. 6 shows a schematic method diagram.

In FIG. 6, the method sequence of one exemplary embodiment of the method for manufacturing a camera module 800 is depicted. A camera module 800 in this exemplary embodiment includes a circuit carrier 301, an image sensor 303 and an optical system holder 311. The method starts in step 601.

In step 602, image sensor 303 is applied to circuit carrier 301. In this exemplary embodiment, circuit carrier 303 is implemented by a conductor foil, onto which strip conductors have already been galvanically applied.

In step 603, a protective layer 305 is applied with the aid of a local pressure molding process to circuit carrier 301 or to the conductor foil and to electrical components 304 mounted on the circuit carrier. In the process, image sensor 303 is not covered by protective layer 305 and is consequently left exposed. At the same time, an optical system holder 311, which is later used for accommodating an optical system, in particular, an objective, is formed in this exemplary embodiment with the aid of protective layer 305. In this exemplary embodiment, molding compound 305 is applied with an increased thickness circularly around image sensor 303, which forms the optical system holder. Alternatively, optical system holder 311 may also be angularly shaped.

The method ends in step 604.

In another exemplary embodiment, the method includes the additional step of applying an optical element in the area of image sensor 303 not covered by the protective layer. This takes place with the aid of an injection molding process. The optical elements may be mounted exactly above exposed image sensors 303 with the aid of previously stored reference markers, which mark the locations that have not been covered by molding compound 305.

In the next exemplary embodiment, another method is described, with the aid of which it is possible to simplify considerably the assembly of cameras for use in automobiles and to implement significantly smaller designs. In this case, a large portion of the electronic components (passive and active components) are embedded in ultra-small design, in what may be ultra-small packages or as bare die in a circuit board for manufacturing the camera modules. Subsequently, an image sensor or image chip is mounted on this circuit board as a flipchip or in chip-on-board (COB) technology. This technology enables the use of only one circuit board in a very compact design. The circuit board thus manufactured in the panel format is overmolded now in the local pressure molding process, the optically active window of the imager component remaining exposed in this process.

Figure 7:
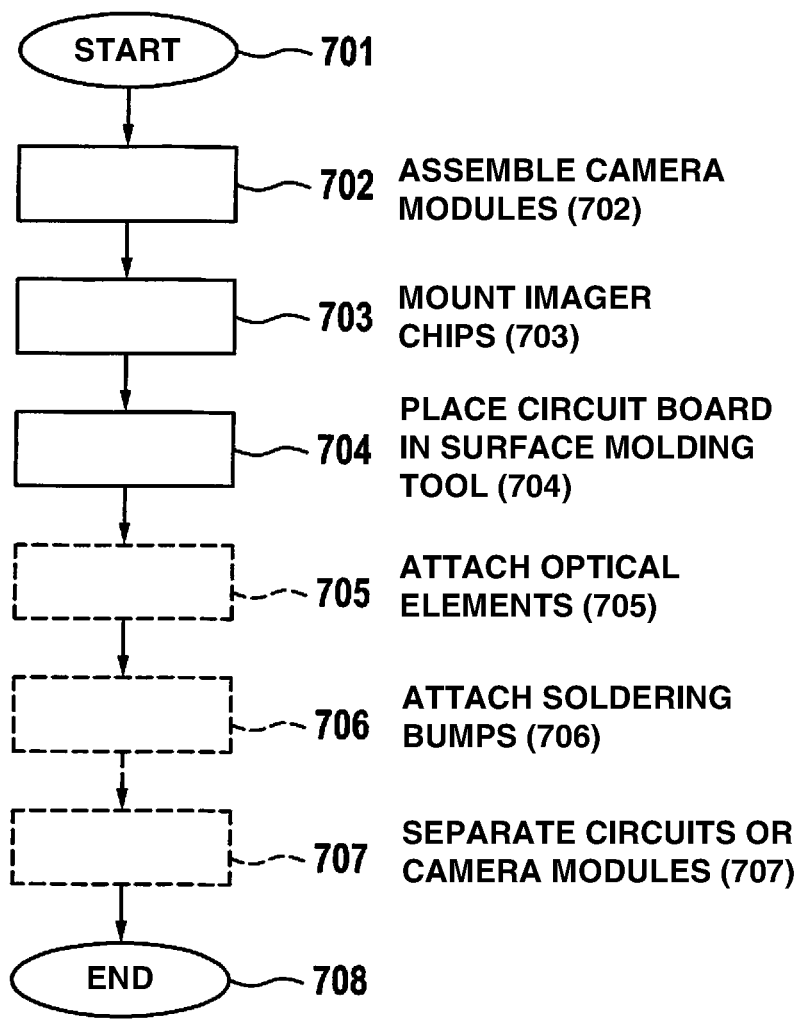
FIG. 7 shows another schematic method diagram.

The method steps required for this method for manufacturing a camera module array are outlined in FIG. 7. The method starts in step 701.

The electronic assembly of the camera or camera modules is manufactured in step 702. Here, ultra-small components or also unhoused components (bare dies) are embedded in the circuit boards or mounted on the circuit board for the purpose of miniaturization. Technologies known to those skilled in the art are used in the process. The aim is, to implement via these highly integrated electronics and with high reliability the smallest possible installation space.

In step 703, imager chips 303 are mounted in COB technology on the circuit board thus manufactured. In alternative specific embodiments, the chips may also be mounted on this board as a micro ball grid array (µBGA) or as a bare die flip chip.

In step 704, the equipped circuit board is placed in the surface molding tool depicted in FIGS. 1 through 3, or, may be introduced into and fixed in upper tool part 302. In this case, the sensor design is directed downwards. The cavity for molding compound 305 introduced in lower tool part 308 is spanned with a separating foil 103, which is applied to the contour of the cavity via vacuum channels. Molding compound is then metered as liquid, solid as a sheet or in granulated form into specific areas of the cavity, so that the sensor surfaces are not wetted with molding compound when the tool is closed. Separating foil 103 protects and seals the sensitive sensor surface of imager 303 from molding compound 305. The metered molding compound 305 liquefies as a result of the hot tool surface and the tool may be closed. Before the tool is completely closed, a vacuum is briefly applied to the cavity in order to prevent air pockets in the mold package.

The flow of molding compound 105 in the cavity and the build-up of the internal mold pressure of molding compound 305 is carried out in a defined manner via compression cylinders/pistons 207 in the lower tool part, which press on separating foil 103 from below in an area of the cavity, which is later separated and is therefore not visible on the subsequent individual panels. In this way the exposure of the sensor membranes of imager 303 and a targeted venting of the mold package is achieved.

Because of the shape of the tool, optical system holders 311 for accommodating optical systems, in particular, objectives, are formed by molding compound 305 on the individual camera modules when molding compound 305 is applied.

Optical elements are attached in optional step 705. In this step, individual lenses and/or lens systems are sprayed directly onto the molding compound and onto the optical window of the imager using a spray process. For this purpose, separate markers are used in order to ensure an optimal alignment of the lenses relative to packaged imager 303. A dual-component injection molding tool, as well as an injection molding machine, are used in this exemplary embodiment for injection molding the lens systems. The injection molding machine is equipped with an elastomer aggregate, for example, for liquid silicone rubber (LSR) and with a handling system.

To apply the lenses, camera module array 101 is placed in a first step in the opened injection molding tool via a handling system and is fixed with centering pins and a vacuum in an ejector side. After the tool is closed, camera module array 101 is oversprayed with transparent plastic by opening a cooled needle valve nozzle. In this case, the transparent component is either a liquid silicone or a transparent polyurethane-based or epoxy-based casting compound. The material may, for example, be a Silopren™ LSR 7092 of Momentive.

The tool cavity may be selectively configured as concave, convex or plane-parallel by changing the contour punch. To render the lens surface non-reflective, a microstructuring may be introduced on the modeling surface of the contour punch, which is optimally modeled by the low-viscosity first component. In this exemplary embodiment, a concave shaping punch is used, which also includes a microstructuring, as a result of which the optical element, once shaped, exhibits non-reflective properties.

The injection molding tool is generally heated with electrical heating cartridges to 120° C. to 180° C., so that a cross-linking of the transparent components is achieved. In order to obtain a better adhesion of the transparent casting compound on the circuit carrier, the circuit carrier in this exemplary embodiment is pre-treated with the aid of plasma or primer. After a predefined cross-linking period, the cast multi-chip module is removed from the tool. At this point, an optical system holder may optionally also be attached to the camera module.

In an optional step 706, soldering bumps 801 required for soldering are attached to the rear side of the circuit board, once the camera module array is removed from the injection molding tool.

In another optional step 707, the finished electronic individual circuits or camera modules are separated from the composite panel or from the camera module array. This may take place via sawing, milling or similar processes, a milling cutter being used in this exemplary embodiment.

Here, conventionally manufactured lens systems may alternatively also be introduced and installed in the holder.

The method ends in step 708.

Figure 8:
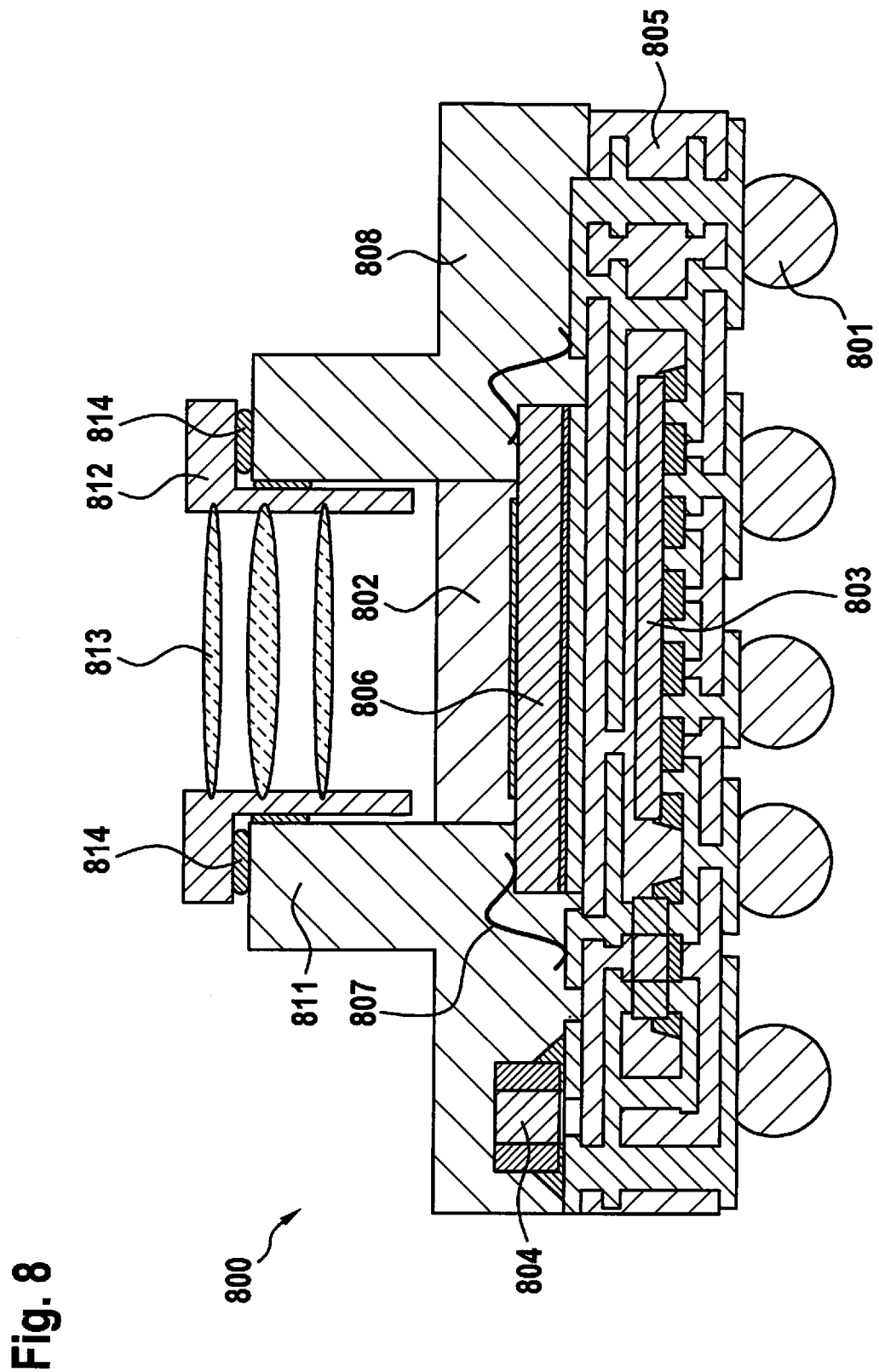
FIG. 8 shows a finished, separated camera module.

In FIG. 8, a finished camera module 800 is imaged again. Image sensor 806 in this camera module 800 is mounted on a multi-layer circuit carrier 805. Circuit carrier 805 is made up of multiple layers of conductor foil which, in turn are constructed of glass fiber-reinforced epoxy resin or are laminated. Additional embedded electrical components 803, which enable a very compact structure of camera module 800, are situated within circuit carrier 805. Also situated on circuit carrier 805, in addition to image sensor 806, is an additional electrical component 804 and electrical terminals 807, which are protected by applied molding compound 808. In this exemplary embodiment, an optical component 802 has been mounted on the image sensor 806, which may also be omitted. Soldering bumps 801 are located on the underside for contacting the camera module.

At the same time, the molding compound or protective layer 808 forms an optical system holder 811. In this exemplary embodiment, an objective 812 has been mounted in this optical system holder which, in turn includes multiple optical components 813. Object 812 has been positioned relative to image sensor 806 with the aid of an active alignment method. An adhesive 814 curable with the aid of UV light has been used for the purpose of attachment, which fixes objective 812 both axially as well as radially on optical system holder 811. Optionally, only a radial or an axial adhesion may also take place, or objective 812 may be pressed into optical system holder 811 via a press fit.

What is claimed is:

1. A method for manufacturing a camera module, the method comprising:
   mounting an image sensor on a circuit carrier;
   applying a protective layer to the circuit carrier;
   wherein the image sensor is not covered by the protective layer and the protective layer forms an optical system holder, which holds the circuit carrier, on which is mounted the image sensor,
   wherein the camera module includes the circuit carrier, the image sensor and the optical system holder, and
   wherein a camera module array is fabricated on a conductor foil and is made up of at least four camera modules including the camera module, the at least four camera modules being situated in rows and columns.

2. The method of claim 1, further comprising:
   applying at least one optical element with the aid of an injection molding process, so that the camera module includes the at least one optical element.

3. The method of claim 1, wherein the circuit carrier includes a further protective layer, so that at least one electronic component is embedded between the protective layer and the further protective layer.

4. The method of claim 1, further comprising:
   attaching soldering points to the camera module.

5. The method of claim 1, wherein the protective layer is applied with a local pressure molding process, in which a molding compound is added to a separating foil and is subsequently pressed locally onto the circuit carrier and/or onto components mounted on the circuit carrier.

6. The method of claim 5, wherein the molding compound is impervious to light in a cured state, the molding compound, which is made of epoxy resin.

7. The method of claim 1, wherein an optical element is shaped as a lens in an injection molding process.

8. The method of claim 1, wherein the conductor foil includes a glass fiber-reinforced epoxy foil with attached strip conductors.

9. The method of claim 1, further comprising:
   attaching soldering bumps to the camera module.

10. A method for manufacturing a camera module array, which includes at least four camera modules, the method comprising:
    manufacturing an array of camera modules, each of the camera modules being made by performing the following:
      mounting an image sensor on a circuit carrier;
      applying a protective layer to the circuit carrier;
      wherein the image sensor is not covered by the protective layer and the protective layer forms an optical system holder, which holds the circuit carrier, on which is mounted the image sensor, and
      wherein the camera module includes the circuit carrier, the image sensor and the optical system holder;
    wherein the camera modules are mechanically connected to one another, the circuit carriers of the camera modules are connected to one another, and the circuit carrier is formed by a cohesive conductor foil, and
    wherein the camera module array is fabricated on the conductor foil and is made up of the at least four camera modules, the camera modules being situated in rows and columns.

11. A method for manufacturing a camera module, the method comprising:
    manufacturing a camera module array, made up of at least two camera modules, by performing the following:
      manufacturing an array of camera modules, each of the camera modules being made by performing the following:
        mounting an image sensor on a circuit carrier;
        applying a protective layer to the circuit carrier;
        wherein the image sensor is not covered by the protective layer and the protective layer forms an optical sensor holder, which holds the circuit carrier, on which is mounted the image sensor, and
        wherein the camera module includes the circuit carrier, the image sensor and the optical system holder;
      wherein the camera modules are mechanically connected to one another, the circuit carriers of the camera modules are connected to one another, and the circuit carrier is formed by a cohesive conductor foil; and
    separating the camera modules.

12. The method of claim 11, wherein the camera modules are separated with the aid of a milling cutter and/or a saw.

* * * * *